(12) United States Patent
Shimmen et al.

(10) Patent No.: US 12,287,542 B2
(45) Date of Patent: Apr. 29, 2025

(54) DISPLAY DEVICE

(71) Applicant: Japan Display Inc., Tokyo (JP)

(72) Inventors: Ryou Shimmen, Tokyo (JP); Michikazu Noguchi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/429,666

(22) Filed: Feb. 1, 2024

(65) Prior Publication Data

US 2024/0288726 A1 Aug. 29, 2024

(30) Foreign Application Priority Data

Feb. 28, 2023 (JP) .................. 2023-029613

(51) Int. Cl.
*G02F 1/1334* (2006.01)
*G02F 1/1333* (2006.01)
*G02F 1/1335* (2006.01)
*G02F 1/13357* (2006.01)

(52) U.S. Cl.
CPC .... *G02F 1/13347* (2021.01); *G02F 1/133368* (2021.01); *G02F 1/133524* (2013.01); *G02F 1/133553* (2013.01); *G02F 1/133615* (2013.01)

(58) Field of Classification Search
CPC ........... G02F 1/13347; G02F 1/133368; G02F 1/133524; G02F 1/133553; G02F 1/133615

USPC .......................................... 349/84
See application file for complete search history.

(56) References Cited

U.S. PATENT DOCUMENTS

2018/0031758 A1    2/2018  Mizuno et al.

FOREIGN PATENT DOCUMENTS

| CN | 102460281 A | * | 5/2012 | ......... G02B 27/0955 |
|----|-------------|---|--------|------------------------|
| JP | 2020101684 A | * | 7/2020 | |
| JP | 2021-140161 A |  | 9/2021 | |

* cited by examiner

*Primary Examiner* — Michael H Caley
*Assistant Examiner* — William D Peterson
(74) *Attorney, Agent, or Firm* — XSENSUS LLP

(57) ABSTRACT

According to one embodiment, a display device includes an array substrate, a counter-substrate facing the array substrate, a liquid crystal layer provided between the array substrate and the counter-substrate, a first transparent cover member including a first main surface facing the counter-substrate, a second main surface located on a side opposite to the first main surface, and a first side surface extending in a first direction, and a light source applying light toward the first side surface along a second direction intersecting the first direction. The first side surface is a protruding curved surface connecting the first main surface with the second main surface and facing the light source.

18 Claims, 11 Drawing Sheets

| Radius of curvature | Center position | Surface property | Luminance gradient (C/A) | Luminance gradient (B/A) | Luminance gradient (C/B) |
|---|---|---|---|---|---|
| – (No chamfering) | – | Rough surface | 48% | 33% | 22% |
| R2.5 | 0 | Mirror surface | 34% | 29% | 7% |
| R2.5 | 0 | Rough surface | 44% | 35% | 14% |
| R2.25 | 0 | Rough surface | 41% | 33% | 12% |
| R2.0 | 0 | Rough surface | 44% | 34% | 15% |
| R2.25 | 0 | Mirror surface | 37% | 29% | 12% |
| R2.0 | 0 | Mirror surface | 37% | 28% | 13% |
| R2.5 | +0.2 | Rough surface | 47% | 33% | 22% |
| R2.5 | −0.2 | Rough surface | 45% | 34% | 16% |

DISPLAY DEVICE

CROSS-REFERENCE TO RELATED APPLICATION

This application is based upon and claims the benefit of priority from Japanese Patent Application No. 2023-029613, filed Feb. 28, 2023, the entire contents of which are incorporated herein by reference.

FIELD

Embodiments described herein relate generally to a display device.

BACKGROUND

In recent years, a display device including a display panel including a polymer dispersed liquid crystal layer (PDLC) and a light source has been proposed. The polymer dispersed liquid crystal layer can switch a scattering state in which light is scattered and a transparent state in which light is transmitted. The display device can display images by switching the display panel to the scattering state. In contrast, the user can visually recognize a background through the display panel by switching the display panel to the transparent state.

DETAILED DESCRIPTION

Figure 1:
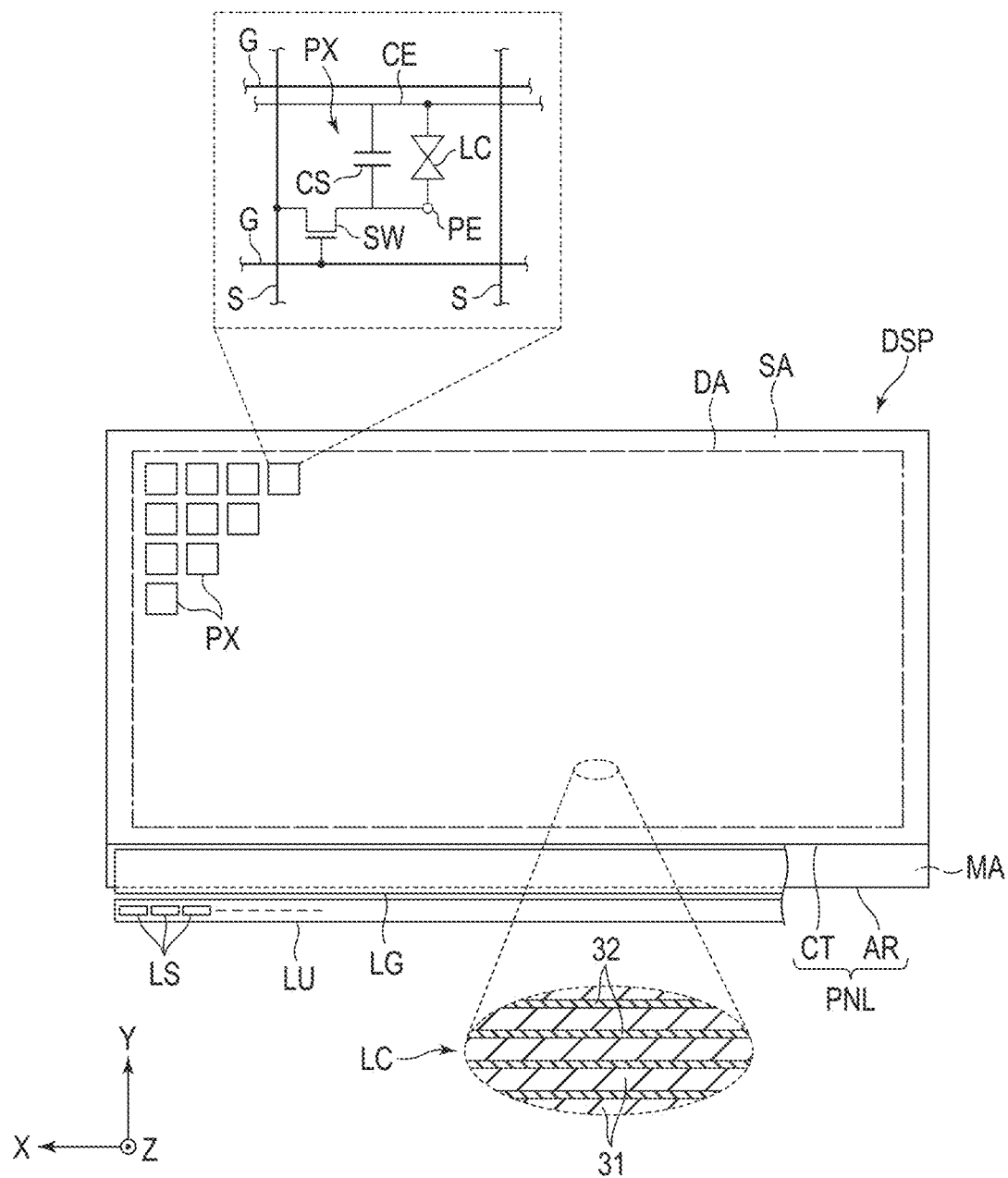
FIG. 1 is a view showing a configuration example of a display device according to a first embodiment.

In general, according to one embodiment, a display device comprises an array substrate, a counter-substrate facing the array substrate, a liquid crystal layer provided between the array substrate and the counter-substrate, a transparent first cover member including a first main surface facing the counter-substrate, a second main surface located on a side opposite to the first main surface, and a first side surface extending in a first direction, and a light source applying light toward the first side surface along a second direction intersecting the first direction. The first side surface is a protruding curved surface connecting the first main surface with the second main surface and facing the light source, when viewed in the first direction.

According to the configuration, a display device capable of improving the display quality can be provided.

Embodiments will be described hereinafter with reference to the accompanying drawings. The disclosure is merely an example, and proper changes within the spirit of the invention, which are easily conceivable by a skilled person, are included in the scope of the invention as a matter of course.

In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the drawings, reference numbers of continuously arranged elements equivalent or similar to each other are omitted in some cases.

In addition, in the specification and drawings, structural elements which function in the same or a similar manner to those described in connection with preceding drawings are denoted by like reference numbers, detailed description thereof being omitted unless necessary.

In the drawings, an X-axis, a Y-axis and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z. Viewing various elements parallel to the third direction Z is referred to as plan view.

The present embodiment discloses a highly translucent liquid crystal display device to which polymer dispersed liquid crystal is applied (so-called transparent display device) as an example of the display device. However, the configuration disclosed in the present embodiment can be applied to other types of display devices.

First Embodiment

FIG. 1 is a view showing a configuration example of a display device DSP according to a first embodiment. The display device DSP comprises a display panel PNL, a light source unit LU, and a light guide LG. In FIG. 1, a part of each of the light source unit LU and the light guide LG is represented by the break line and is omitted.

The display panel PNL comprises an array substrate AR and a counter-substrate CT stacked in the third direction Z. The counter-substrate CT faces the array substrate AR. In FIG. 1, each of the array substrate AR and the counter-substrate CT has a rectangular shape elongated in the first direction X as a shape in plan view. However, the shapes of the array substrate AR and the counter-substrate CT are not limited to this example.

A width of the array substrate AR in the second direction Y is greater than a width of the counter-substrate CT in the second direction Y. Thus, the array substrate AR includes a mounting area MA which does not overlap with the counter-substrate CT. In the mounting area MA, a flexible printed circuit and integrated circuits to be described later are mounted.

The display panel PNL includes a display area DA for displaying an image and a frame-shaped peripheral area SA surrounding the display area DA. Both the display area DA and the peripheral area SA are formed on a portion on which the array substrate AR and the counter-substrate CT overlap with each other. The display area DA includes a plurality of pixels PX arrayed in matrix in the first direction X and the second direction Y.

The display panel PNL further comprises a liquid crystal layer LC enclosed between the array substrate AR and the counter-substrate CT. As enlarged and schematically shown at a lower side of FIG. 1, the liquid crystal layer LC is composed of polymer dispersed liquid crystal containing polymer 31 and liquid crystal molecules 32. As one example, the polymer 31 is liquid crystal polymer. The polymer 31 is formed into a stripe shape extending along the first direction X and is aligned in the second direction Y. The liquid crystal molecules 32 are dispersed in gaps of the polymer 31 and aligned such that their major axes extend in the first direction X.

Each of the polymer 31 and the liquid crystal molecules 32 has optical anisotropy or refractive anisotropy. The responsiveness of the polymer 31 to the electric field is lower than that of the liquid crystal molecules 32 to the electric field. As one example, the alignment direction of the polymer 31 is hardly varied irrespective of the presence or absence of the electric field. In contrast, the alignment direction of the liquid crystal molecules 32 is varied in response to the voltage applied to the liquid crystal layer LC.

In a state in which the voltage is not applied to the liquid crystal layer LC, optical axes of the respective polymer 31 and liquid crystal molecules 32 are parallel to each other and the light made incident on the liquid crystal layer LC is not substantially scattered in the liquid crystal layer LC and transmitted (transparent state).

In a state in which the voltage is applied to the liquid crystal layer LC, the optical axes of the polymer 31 and the liquid crystal molecules 32 intersect each other and the light made incident on the liquid crystal layer LC is scattered in the liquid crystal layer LC (scattered state). In other words, in the liquid crystal layer LC, the transparent state and the scattered state can be switched in accordance with the applied voltage.

As expanded and shown at the upper side of FIG. 1, a plurality of scanning lines G and a plurality of signal lines S are arranged in the display area DA. The plurality of scanning lines G extend in the first direction X and are arranged in the second direction Y. The plurality of signal lines S extend in the second direction Y and are arranged in the first direction X.

Each pixel PX comprises a switching element SW, a pixel electrode PE, a common electrode CE, and a capacitance CS. The switching element SW is constituted by, for example, a thin-film transistor (TFT) and is electrically connected to the scanning line G and the signal line S. The pixel electrode PE is electrically connected to the switching element SW.

The liquid crystal layer LC (particularly, liquid crystal molecules 32) is driven by an electric field produced between the pixel electrode PE and the common electrode CE. The capacitance CS is formed between, for example, an electrode having the same electric potential as the common electrode CE and an electrode having the same electric potential as the pixel electrode PE.

The light source unit LU and the light guide LG are arranged along the first direction in the mounting area MA. The light source unit LU comprises a plurality of light sources LS arranged in the first direction X. Each of the light sources LS applies light toward the light guide LG. For example, lens such as prismatic lenses and the like can be used as the light guide LG.

The plurality of light sources LS include a light emitting element emitting red light, a light emitting element emitting green light, and a light emitting element emitting blue light, for example. These light emitting elements may be arranged in the first direction X or be stacked in the third direction Z. Light emitting diode (LED) can be used as the light emitting element.

Figure 2:
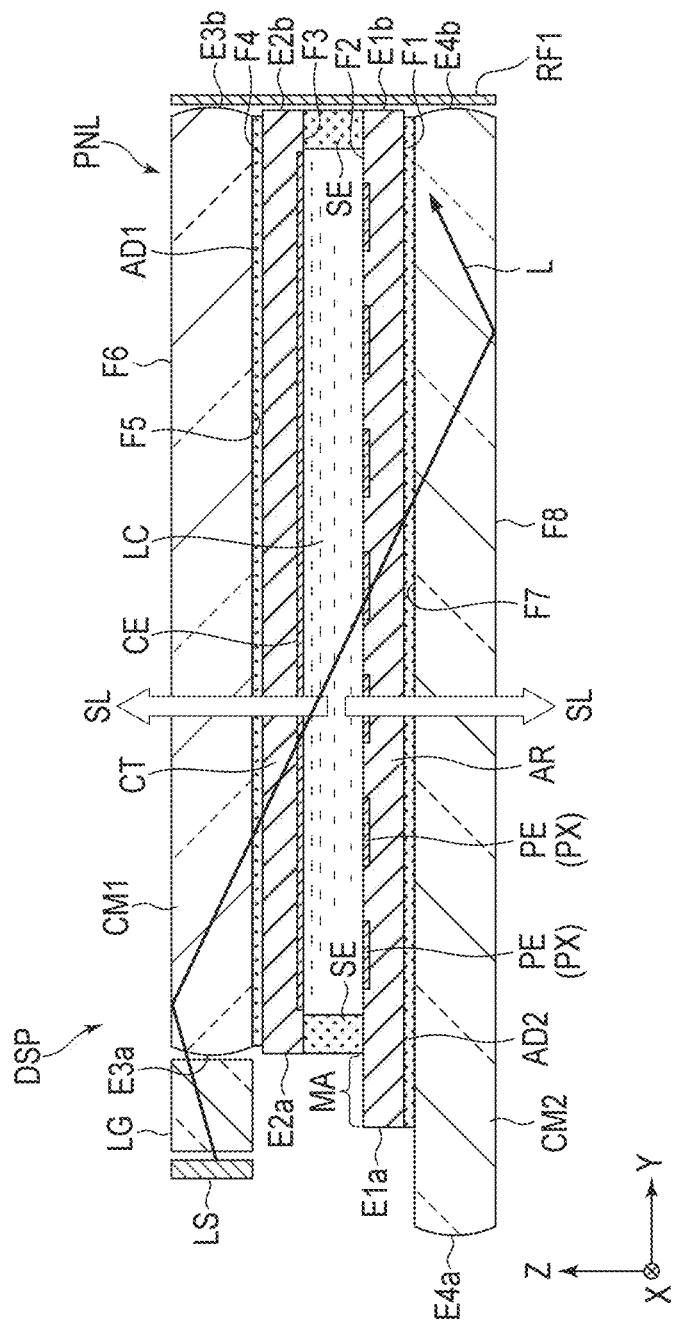
FIG. 2 is a schematic cross-sectional view of a display device.

FIG. 2 is a schematically cross-sectional view of the display device DSP. In this view, structures of the display panel PNL and the like are schematically shown, and the elements such as the scanning lines G, the signal lines S, the switching element SW, and the like are omitted.

The array substrate AR is bonded to the counter-substrate CT with a sealing material SE. The sealing material SE has a shape surrounding the display area DA in plan view. The liquid crystal layer LC is enclosed in a space surrounded by the sealing material SE.

The array substrate AR comprises the above-described pixel electrode PE. The counter-substrate CT comprises the above-described common electrode CE. The pixel electrode PE and the common electrode CE face each other via the liquid crystal layer LC. The arrangement of the pixel electrode PE and the common electrode CE is not limited to this example. As another example, the array substrate AR may comprise both the pixel electrode PE and the common electrode CE.

The array substrate AR includes a main surface F1, a main surface F2 located on a side opposite to the main surface F1, and side surfaces E1a and E1b connecting the main surface F1 with the main surface F2. The counter-substrate CT includes a main surface F3, a main surface F4 located on a side opposite to the main surface F3, and side surfaces E2a and E2b connecting the main surface F3 with the main surface F4. The main surface F3 faces the main surface F2 via the liquid crystal layer LC.

The display panel PNL further comprises a first cover member CM1 and a second cover member CM2. Both the first cover member CM1 and the second cover member CM2 are transparent and are cover glasses formed of glass, as an example. The first cover member CM1 and the second cover member CM2 may be formed of a transparent resin material such as plastic.

The first cover member CM1 has the same thickness as the second cover member CM2, for example. In this example, the thickness refers to the length along the third direction Z. The thicknesses of the first cover member CM1 and the second cover member CM2 are sufficiently greater than the thicknesses of the array substrate AR and the counter-substrate CT. As one example, the first cover member CM1 and the second cover member CM2 are two or more times as thick as the array substrate AR and the counter-substrate CT.

The first cover member CM1 includes a main surface F5 facing the main surface F4, a main surface F6 located on a side opposite to the main surface F5, and side surfaces E3a and E3b connecting the main surface F5 with the main surface F6. In the present embodiment, the main surface F5 corresponds to a first main surface, the main surface F6 corresponds to a second main surface, the side surface E3a corresponds to a first side surface, and the side surface E3*b* corresponds to a second side surface.

The main surface F4 is bonded to the main surface F5 by a transparent adhesive layer AD1. For example, optical clear adhesive (OCA) can be used as the first adhesive layer AD1.

The second cover member CM2 includes a main surface F7 facing the main surface F1, a main surface F8 located on a side opposite to the main surface F7, and side surfaces E4*a* and E4*b* connecting the main surface F7 with the main surface F8. In the present embodiment, the main surface F7 corresponds a the third main surface, the main surface F8 corresponds to a fourth main surface, the side surface E4*a* corresponds to a fourth side surface, and the side surface E4*b* corresponds to a third side surface.

The main surface F1 is bonded to the main surface F7 by a transparent second adhesive layer AD2. As in the case of the first adhesive layer AD1, OCA can be used as the second adhesive layer AD2.

The side surfaces E1*a*, E2*a*, E3*a*, and E4*a* are all located on the light source LS side (incidence side). The side surfaces E1*b*, E2*b*, E3*b*, and E4*b* are all located on a side opposite to the light source LS (opposite incidence side).

The mounting area MA is formed on a portion of the array substrate AR which protrudes relative to the side surface E2*a*. The side surface E4*b* is located directly under the side surface E3*b*, for example. The side surface E4*a* is located on a position protruding relative to the side surface E1*a* in the direction opposite to the second direction Y, for example.

The display panel PNL further comprises a reflective material RF1. The reflective material RF1 is located in the vicinity of the side surfaces E1*b*, E2*b*, E3*b*, and E4*b*. In other words, the reflective material RF1 is located on a side opposite to the light source unit LU with the first cover member CM interposed therebetween in plan view. The reflective material RF1 is, for example, a reflective tape bonded to the side surfaces E1*b*, E2*b*, E3*b*, and E4*b*.

The light source LS faces the side surface E3*a*. The light guide LG is located between the side surface E3*a* and the light source LS. In FIG. 2, an example of a path of light L emitted from the light source LS is shown.

The light source LS applies light along the second direction Y. More specifically, the light source LS applies light toward the side surface E3*a*. The light L emitted from the light source LS is made incident on the side surface E3*a* through the light guide LG. This light L travels toward the opposite incidence side while repeatedly subjected to total reflection between the main surface F6 and the main surface F8. The light L reaching the side surfaces E1*b*, E2*b*, E3*b*, and E4*b* is reflected by the reflective material RF1 and travels toward the incidence side while repeatedly subjected to total reflection between the main surface F6 and the main surface F8.

In the vicinity of the pixel PX in the transparent state, the light L is hardly scattered on the liquid crystal layer LC. Therefore, the light L hardly leaks to the outside of the first cover member CM1 and the second cover member CM2.

In contrast, the light L is scattered on the liquid crystal layer LC in the vicinity of the pixels PX in the scattered state. This scattered light SL is emitted from the first cover member CM1 and the second cover member CM2 and is visually recognized as a display image by the user. Gradation expression of the scattering degree (luminance) can also be realized by defining the voltage applied to the pixel electrode PE within a predetermined range in stages.

The external light made incident on the first cover member CM1 and the second cover member CM2 is transmitted through the liquid crystal layer LC while hardly scattered.

That is, when the display device DSP is viewed from the first cover member CM1 side, the background on the second cover member CM2 side is visible, and when the display device DSP is viewed from the second cover member CM2 side, the background on the first cover member CM1 side is visible.

As for an image display system of the display device DSP, for example, a field sequential system in which first sub-frames displaying red images by turning on red light emitting elements, second sub-frames displaying green images by turning on green light emitting elements, and third sub-frames displaying blue images by turning on blue light emitting elements are repeated, among the plurality of light sources LS, can be employed.

Figure 3:
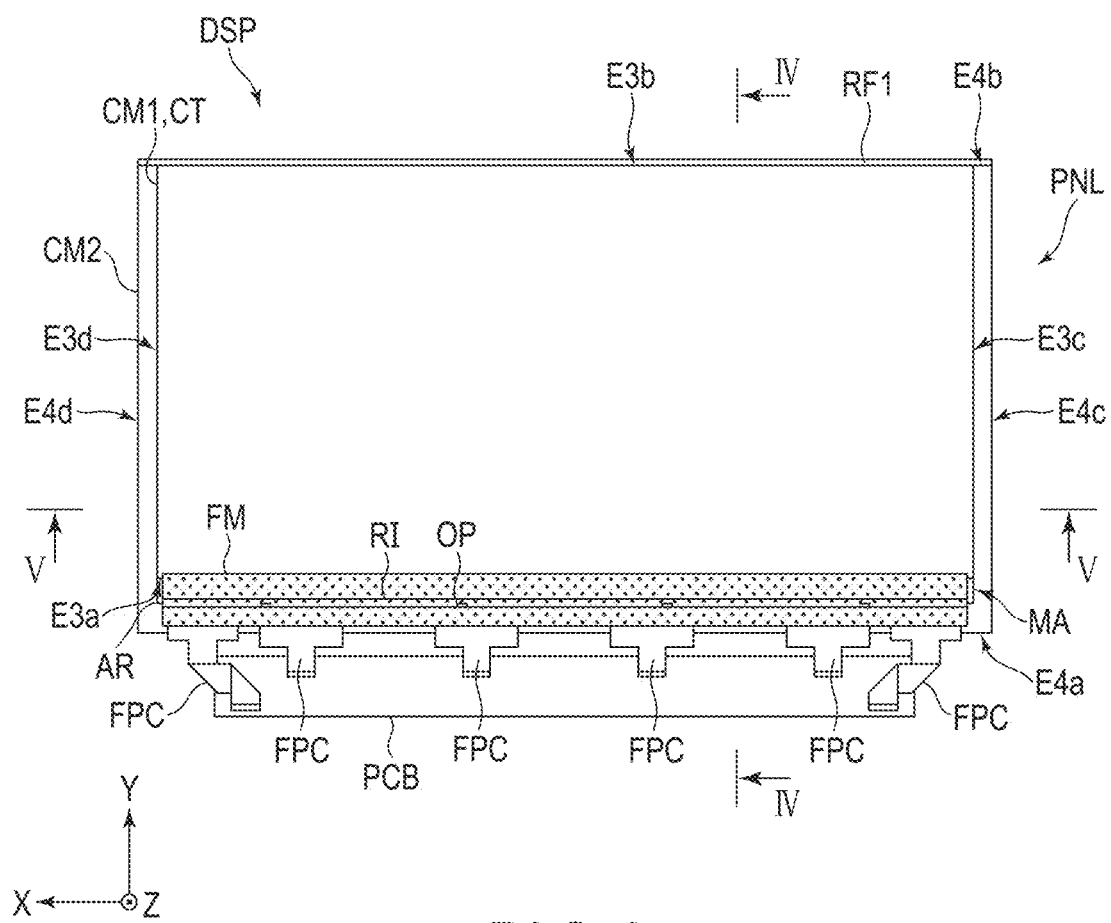
FIG. 3 is a schematic cross-sectional view showing the display device including a first cover member and a second cover member shown in FIG. 2.

FIG. 3 is a schematic plan view showing the display device DSP including the first cover member CM1 and the second cover member CM2 shown in FIG. 2.

First, an example of the configuration that can be used in the vicinity of the mounting area MA will be described. The display device DSP further comprises a frame FM holding the light source unit LU and the light guide LG. The frame FM has a shape elongated in the first direction X, covers the mounting area MA, and overlaps with a part of the second cover member CM2. The frame FM includes a rib RI extending in the first direction X and a plurality of apertures OP in the example shown in FIG. 3.

One end of each of a plurality of flexible printed circuits FPC is connected to the mounting area MA. The other end of each of these flexible printed circuits FPC is connected to a circuit board PCB, which is a rigid printed circuit board, for example.

Next, the first cover member CM1 and the second cover member CM2 will be described.

In the example shown in FIG. 3, the plan shapes of the counter-substrate CT and the first cover member CM1 are the same. The second cover member CM2 has a width greater than each of the array substrate AR, the counter-substrate CT, and the first cover member CM1 in the first direction X.

Thus, both ends of the second cover member CM2 in the first direction X protrude relative to the array substrate AR, the counter-substrate CT, and the second cover member CM2. The both ends of the second cover member CM2 can be used, for example, for mounting a frame protecting both sides of the display panel PNL in the first direction X.

The first cover member CM1 further includes side surfaces E3*c* and E3*d*. In the present embodiment, the sides surface E3*c* corresponds to a fifth side surface, and the side surface E3*d* corresponds to a sixth side surface. The side surfaces E3*c* and E3*d* connect the main surface F5 with the main surface F6.

The side surfaces E3*a* and E3*b* extend in the first direction X and are arranged in the second direction Y. The side surface E3*a* and the side surface E3*b* are arranged in the second direction Y in this order, for example. The side surfaces E3*c* and E3*d* extend in the second direction Y and are arranged in the first direction X. The side surface E3*c* and the side surface E3*d* are arranged in the first direction X in this order, for example.

The second cover member CM2 further includes side surfaces E4*c* and E4*d*. In the present embodiment, the side surface E4*c* corresponds to a seventh side surface, and the side surface E4*d* corresponds to an eighth side surface. The side surfaces E4*c* and E4*d* connect the main surface F7 with the main surface F8.

The side surfaces E4*a* and E4*b* extend in the first direction X and are arranged in the second direction Y. The side surface E4a and the side surface E4b are arranged in the second direction Y in this order, for example. The side surfaces E4c and E4d extend in the second direction Y and are arranged in the first direction X. The side surface E4c and the side surface E4d are arranged in the first direction X in this order, for example.

As shown in FIG. 3, the side surface E4c is located on a position protruding relative to the side surface E3c in the direction opposite to the first direction X, and the side surface E4d is located on a position protruding relative to the side surface E4c in the first direction X. The reflective material RF1 is provided along the first direction X.

Next, the configuration which can be applied to the first cover member CM1 and the second cover member CM2 will be described with reference to FIG. 4 and FIG. 5.

Figure 4:
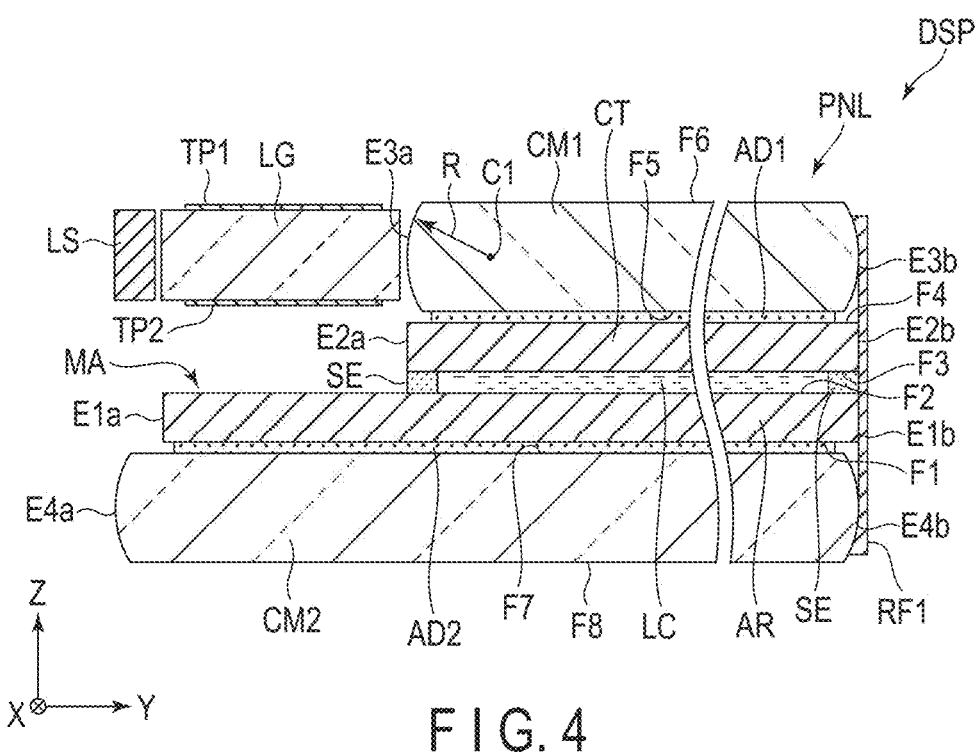
FIG. 4 is a schematic cross-sectional view of the display device along line IV-IV shown in FIG. 3.

FIG. 4 is a schematic cross-sectional view of the display device DSP along line IV-IV shown in FIG. 3. FIG. 5 is a schematic cross-sectional view of the display device DSP along line V-V shown in FIG. 4. The section of the display device DSP is viewed in the first direction X in FIG. 4, and the section of the display device DSP is viewed in the second direction Y in FIG. 5. The first cover member CM1 includes the side surfaces E3a, E3b, E3c, and E3d as described above.

As shown in FIG. 4, the side surfaces E3a and E3b are protruding curved surfaces connecting the main surface F5 with the main surface F6. More specifically, the side surface E3a is the protruding curved surface in the direction opposite to the second direction Y, and the side surface E3b is the protruding curved surface in the second direction Y.

In other words, the side surfaces E3a and E3b have arcuate cross-sectional shapes. The cross-sectional shapes of the side surfaces E3a and E3b can be regarded as R-letter shapes. The side surfaces E3a and E3b extend in the first direction X with these cross-sectional shapes. When the light source LS is focused, the side surface E3a is the protruding curved surface facing the light source LS, and the side surface E3b is a protruding curved surface spaced apart from the light source LS.

Figure 5:
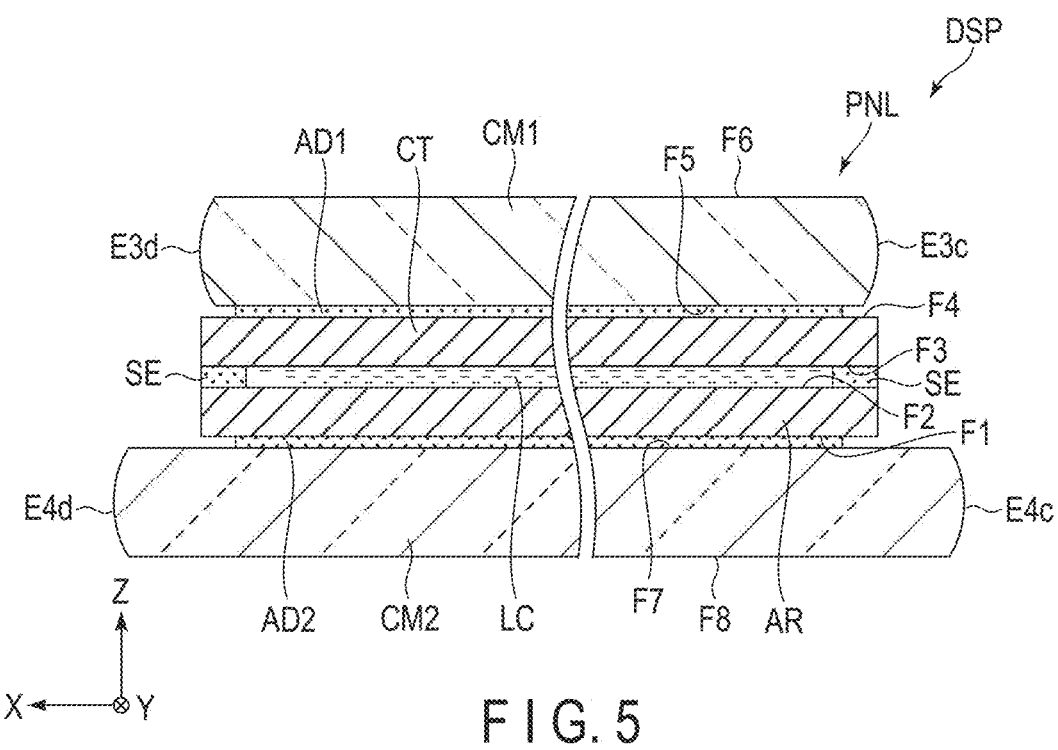
FIG. 5 is a schematic cross-sectional view of the display device along line V-V shown in FIG. 3.

As shown in FIG. 5, the side surfaces E3c and E3d are the protruding curved surfaces connecting the main surface F5 with the main surface F6. More specifically, the side surface E3c is the protruding curved surface in the direction opposite to the first direction X, and the side surface E3d is the protruding curved surface in the first direction X. In other words, the side surfaces E3c and E3d have arcuate cross-sectional shapes. The side surfaces E3c and E4d extend in the second direction with these cross-sectional shapes.

As described above, the second cover member includes the side surfaces E4a, E4b, E4c, and E4d. As shown in FIG. 4, the side surfaces E4a and E4b are protruding curved surfaces connecting the main surface F7 with the main surface F8.

More specifically, the side surface E4a is the protruding curved surface in the direction opposite to the second direction Y, and the side surface E4b is the protruding curved surface in the second direction Y. In other words, the side surfaces E4a and E4b have arcuate cross-sectional shapes. The side surfaces E4a and E4b extend in the first direction X with these cross-sectional shapes.

As shown in FIG. 5, the side surfaces E4c and E4d are the protruding curved surface connecting the main surface F7 with the main surface F8. More specifically, the side surface E4c is the protruding curved surface in the direction opposite to the first direction X, and the side surface E4d is the protruding curved surface in the first direction X. In other words, the side surfaces E4c and E4d have arcuate cross-sectional shapes. The side surfaces E4c and E4d extend in the second direction Y with these cross-sectional shapes.

As described above, in the present embodiment, the side surfaces E3a, E3b, E3c, and E3d and the side surfaces E4a, E4b, E4c, and E4d are all formed into protruding curved surfaces. In the present embodiment, the side surfaces E3a, E3b, E3c, and E3d and the side surfaces E4a, E4b, E4c, and E4d all have the same surface properties. The side surface E3a of the first cover member CM1 will be further described, while the side surfaces E3b, E3c, E3d, E4a, E4b, E4c, and E4d are formed in the same manner.

As shown in FIG. 4, the side surface E3a is a protruding curved surface. The side surface E3a has a radius of curvature R uniform in the first direction X. A center C1 of the radius of curvature R is located at the center of the thickness of the first cover member CM1, for example.

The radius of curvature R of the side surface E3a is smaller than the thickness of the first cover member CM1, for example. The radius of curvature R of the side surface E3a is greater than the thicknesses of the array substrate AR and the counter-substrate CT, for example. When the thickness of the first cover member CM1 is 2.75 mm, the radius of curvature R of the side surface E3a is, for example, 2.0 mm or more and 2.5 mm or less and is 2.5 mm in one example. The radius of curvature R of the side surface E3a can be changed appropriately according to the thickness of the first cover member CM1 and the like.

Next, the surface property of the side surface E3a will be described.

As one example, the side surface E3a can be formed into a mirror surface. The mirror surface is, for example, a smooth surface substantially having no uneven parts. The side surface E3a is formed by, for example, polishing after CNC machining and the like.

In this case, in terms of the parameters specified in JIS B 0601:2013, an arithmetic mean roughness Ra of the side surface E3a is, for example, 0.02 μm or less, and a maximum height roughness Rz of the side surface E3a is, for example, 0.2 μm or less. The parameters in the case where the side surface E3a is formed into the mirror surface are not limited to the above example.

The side surface E3a may be formed into a rough surface in other examples. The rough surface is, for example, a surface having fine and random uneven parts. In other words, the side surface E3a is formed into a frosted glass-like shape. The side surface E3a is formed by CNC machining and the like. The side surface E3a has a surface property rougher than those of the main surfaces F5 and F6, for example.

In this case, in terms of the parameters specified in JIS B 0601, the arithmetic mean roughness Ra of the side surface E3a is, for example, 0.1 μm or more and 0.5 μm or less, and the maximum height roughness Rz of the side surface E3a is, for example, 1.5 μm or more and 9.5 μm or less. The parameters in the case where the side surface E3a is formed into the frosted glass-like shape are not limited to the above example.

As shown in FIG. 4, reflective tapes TP1 and TP2 are provided on the upper surface and the lower surface of the light guide LG, respectively.

Figure 6:
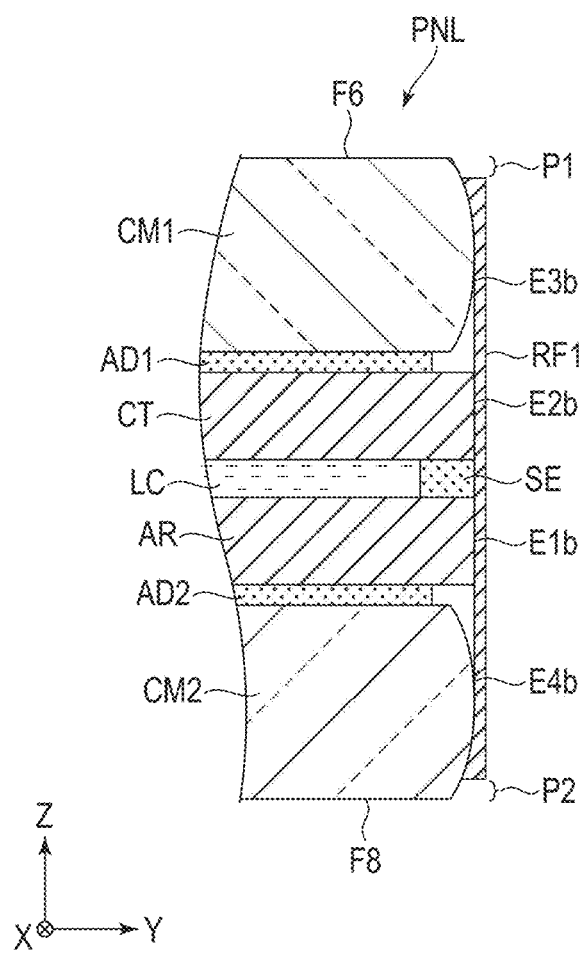
FIG. 6 is an expanded sectional view showing an opposite incidence side of the display device.

FIG. 6 is an expanded sectional view showing the opposite incidence side of the display device DSP. The Reflective material RF1 is provided from the side surface E3b to the side surface E4b. In the example shown in FIG. 6, the reflective material RF1 is not provided on the entire side surface E3b and the entire side surface E4d.

In other words, the side surface E3b includes a portion P1 that does not overlap with the reflective material RF1 in the second direction Y, and the side surface E4b includes a portion P2 that does not overlap with reflective material RF1 in the second direction Y. The portion P1 is located on the main surface F6 side of the side surface E3b, and the portion P2 is located on the main surface F8 side of the side surface E4b. The lengths of the portion P1 and the portion P2 in the third direction Z are, for example, 0.5 mm.

Figure 7:
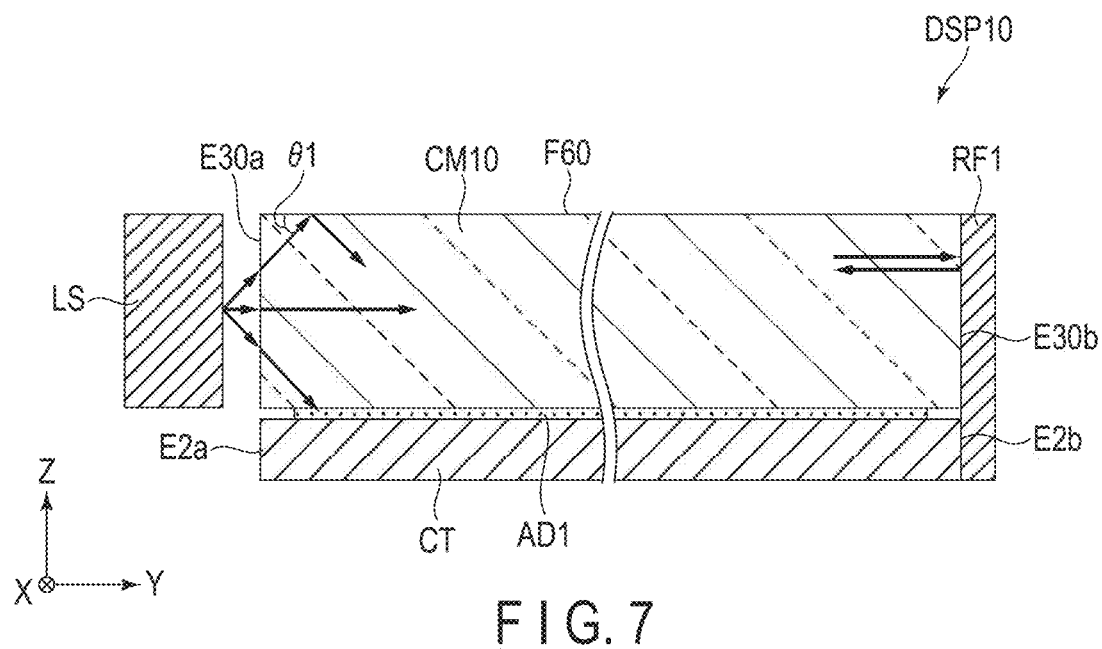
FIG. 7 is a view illustrating propagation of light in a display device according to a comparative example.
Figure 8:
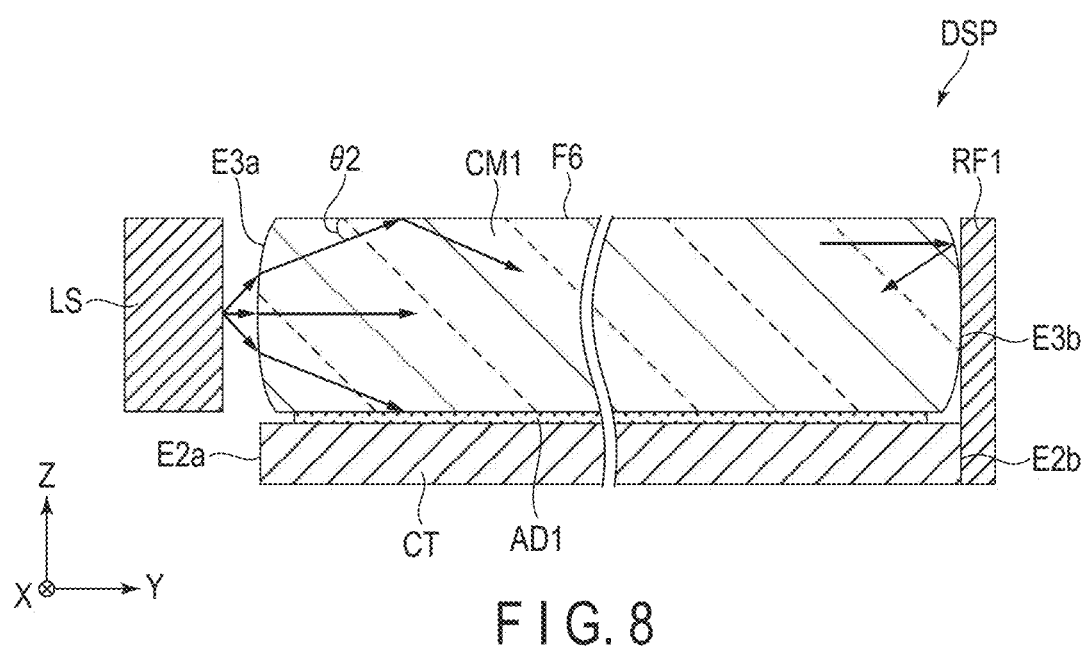
FIG. 8 is a view illustrating propagation of light in the display device according to a first embodiment.

Next, the propagation of light on the incidence side and the opposite incidence side of the display panel PNL will be described. FIG. 7 is a view illustrating the propagation of light in a display device DSP10 according to a comparative example. FIG. 8 is a view illustrating the propagation of light in the display device DSP according to the present embodiment. In FIG. 7 and FIG. 8, some constituent elements such as the display panel PNL, the light guide LG, and the like are omitted.

The display device DSP 10 according to the comparative example comprises a first cover member CM10. The first cover member CM10 includes side surfaces E30a and E30b. The side surface E30a corresponds to the side surface of the incidence side, and the side surface E30b corresponds to the side surface of the opposite incidence side.

The side surfaces E30a and E30b are not the curved surfaces but the flat surfaces parallel to an X-Z plane defined by the first direction X and the third direction Z. The constituent element of the display device DSP 10 other than the cover member CM 10 are the same as those of the display device DSP.

First, the incidence side will be described. The propagation of light applied from the light sources LS provided at the same position is shown in FIG. 7 and FIG. 8.

In FIG. 7, the light made incident on the first cover member CM10 from the side surface E30a travels along the second direction Y while repeatedly reflected at an interface between the first cover member CM10 and an air layer and an interface between the second cover member (not shown) and the air layer.

As shown in FIG. 7, the angle formed between the light made incident from the side surface E30a that travels to the main surface F60 of the first cover member CM10 and the main surface F60 is defined as an angle θ1. In FIG. 8, the angle formed between the light made incident from the side surface E3a that travels to the main surface F6 of the first cover member CM1 and the main surface F6 is defined as an angle θ2.

As described above, the side surface E3a of the first cover member CM1 is the protruding curved surface facing the light source LS. Since the light applied from the light source LS is refracted at the side surface E3a and is made incident on the first cover member CM1, the angle θ2 becomes smaller than the angle θ1.

By making the angle θ2 smaller, the number of times of the light traveling along the second direction Y being subjected to total reflection between the main surface F6 and the main surface F8 is decreased. In other words, the number of times of the light passing through the liquid crystal layer LC per unit length of the second direction Y is less for the display device DSP than for the display device DSP10.

By light passing through the array substrate AR and the counter-substrate CT, the light is scattered by the liquid crystal layer LC or absorbed or scattered by the wiring line of the array substrate AR and the like. These can be factors for the light applied from the light source LS to become weak as propagating to the opposite incidence side.

In the present embodiment, since the number of times of the light passing through the liquid crystal layer LC on the incidence side is reduced, the light propagating along the second direction Y hardly becomes weak. In other words, compared to the comparative example, stronger light can be sent to the opposite incidence side.

Next, the opposite incidence side will be described.

As shown in FIG. 7, in the display device DSP10 according to the comparative example, when the light traveling along the second direction Y reaches the opposite incidence side and is reflected by the reflective material RF1, this light becomes the light traveling in the direction opposite to the second direction Y.

On the other hand, as shown in FIG. 8, in the display device DSP according to the present embodiment, when the light traveling along the second direction Y reaches the opposite incidence side, this light is refracted at the side surface E3b before and after being reflected by the reflective material RF1. As a result, this light is converted to the light traveling toward the liquid crystal layer LC. As a result, the light made incident on the liquid crystal layer LC on the opposite incidence side increases, and the luminance on the opposite incidence side can be thereby increased.

Figures 9, 10:
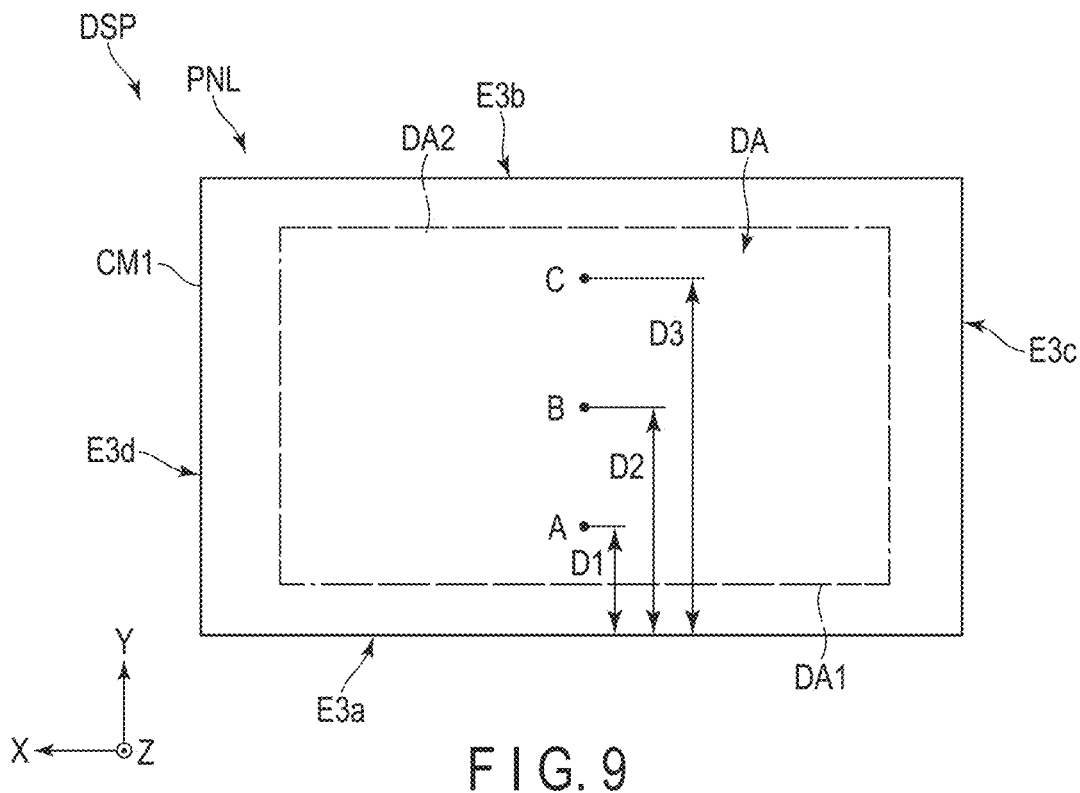
FIG. 9 is a diagram showing measurement points of luminance intensity in a simulation.
FIG. 10 is a table showing a simulation result.

FIG. 9 is a diagram showing measurement points of luminance intensity in a simulation. In FIG. 9, the first cover member CM1 is shown, and the other constitutional elements of the display device DSP are omitted. In FIG. 9, the first cover member CM1 is shown in plan view.

The conditions in the simulation are as follows.

Measurement points A, B, and C are located at the center of the width of the first cover member CM1 in the first direction X. A distance D1 from the side surface E3a to the measurement point A is 57 mm, a distance D2 from the side surface E3a to the measurement point B is 130 mm, and a distance D3 from the side surface E3a to the measurement point C is 216 mm. The measurement point B corresponds to the center of the width of the display area DA in the second direction Y. Distances from the side surfaces E3a and E3b to ends DA1 and DA2 of the display area DA are 3 mm, respectively.

The width of the first cover member CM1 in the second direction Y is 265.2 mm, the thickness of the first cover member CM1 is 2.75 mm, and the refractive index of the first cover member CM1 is 1.47.

The thickness of the second cover member CM2 is 2.75 mm, and the refractive index of the second cover member CM2 is 1.47. The distance from the side surface E4a of the second cover member CM2 to the end DA1 of the display area DA is 28.7 mm.

The side surfaces E3a, E3b, E3c, and E3d and the side surfaces E4a, E4b, E4c, and E4d are all protruding curved surfaces. The side surfaces E3a, E3b, E3c, and E3d and the side surfaces E4a, E4b, E4c, and E4d all have the same surface properties.

The thickness of a transparent substrate included in the array substrate AR is 0.5 mm, and the refractive index of this transparent substrate is 1.51. The switching element SW, the pixel electrode PE (shown in FIG. 1), and the like are mounted on this transparent substrate. The thickness of a transparent substrate included in the counter-substrate CT is 0.7 mm, and the refractive index of this transparent substrate is 1.51. The common electrode CE (shown in FIG. 1) is mounted on this transparent substrate.

The thickness of each of the first adhesive layer AD1 and the second adhesive layer AD2 is 0.125 mm, and the refractive index of each of the first adhesive layer AD1 and the second adhesive layer AD2 is 1.47. The thickness of the light guide LG is 2.4 mm, and the thickness of each of the reflective tapes TP1 and TP2 is 0.21 mm.

Thus, the refractive indices of the transparent substrate of the array substrate AR, the transparent electrode of the counter-substrate CT, the first adhesive layer AD1, the second adhesive layer AD2, the first cover member CM1, and the second cover member CM2 are equivalent to one another. In this example, "equivalent" is not limited to a case where the refractive index difference is zero, but indicates a case where the refractive index difference is 0.05 or less.

In the simulation, the radius of curvature of the side surfaces E3a, E3b, E3c, and E3d and the side surfaces E4a, E4b, E4c, and E4d are varied in three ways: 2.0 mm, 2.25 mm, and 2.5 mm. The center of the radius of curvature is located at the center of the thickness of each of the first cover member CM1 and the second cover member CM2.

However, in a case where the radius of curvature is 2.5 mm, the position of the center of the radius of curvature is varied 0.2 mm in the third direction Z (shown as "+0.2" in FIG. 10) and 0.2 mm in the direction opposite to the third direction Z (shown as "−0.2" in FIG. 10).

In the simulations, the surface properties of the side surfaces E3a, E3b, E3c, and E3d and the side surfaces E4a, E4b, E4c, and E4d are varied in two ways: the mirror surface and the rough surface.

FIG. 10 is a table showing a simulation result. The darkening of the luminance of the display from the incidence side to the opposite incidence side is referred to as luminance gradient. The luminance gradient is calculated by the ratio of luminance intensities at the measurement points A, B, and C, calculated according to the above-described conditions.

A luminance gradient (C/A) is the ratio of the luminance intensity at the measurement point A and the luminance intensity at the measurement point C. A luminance gradient (B/A) is the ratio of the luminance intensity at the measurement point A and the luminance intensity at the measurement point B. A luminance gradient (C/B) is the ratio of the luminance intensity at the measurement point B and the luminance intensity at the measurement point C. As a value of the luminance gradient decreases, the change in the luminance in the second direction Y becomes smaller. Therefore, the luminance gradient is preferably small in a display device.

In FIG. 10, as a comparative example, a case where the side surfaces E3a, E3b, E3c, and E3d and the side surfaces E4a, E4b, E4c, and E4d are flat is shown as "no chamfering". The surface properties in this comparative example are rough surfaces.

As shown in FIG. 10, it is confirmed that the luminance gradient (C/A), the luminance gradient (B/A), and the luminance gradient (C/B) become generally smaller than in the comparative example and the display quality of the display device DSP is improved by forming the side surfaces E3a, E3b, E3c, and E3d and the side surfaces E4a, E4b, E4c, and E4d into protruding curved surfaces.

The luminance gradient (C/A) is confirmed to be 4 to 14% smaller than that in the comparative example. In the luminance gradient (C/A), it is confirmed that a value of luminance gradient becomes the smallest when the radius of curvature is 2.5 mm and the surface property is the mirror surface. In terms of the surface properties, in the luminance gradient (C/A), a value of the luminance gradient in a case where the surface property is the mirror surface is smaller than a value in a case where the surface property is the rough surface.

In the luminance gradient (C/A), it is confirmed that the value of the luminance gradient becomes smaller when the position of the center of the radius of curvature is changed as well. More specifically, it is confirmed that the value of the luminance gradient becomes smaller in a case where the position of the center of the radius of curvature is changed in the direction opposite to the third direction Z than a case where the position of the center of the radius of curvature is changed in the third direction Z. Thus, from the luminance gradient (C/A) in the simulation result as well, it can be confirmed that the light made incident on the liquid crystal layer LC increases on the opposite incidence side.

The display device DSP configured as described above can improve the display quality. More specifically, the display device DSP comprises the array substrate AR, the counter-substrate CT, the liquid crystal layer LC provided between the array substrate AR and the counter-substrate CT, the first cover member CM1 including the side surface E3a, and the light source LS applying light toward the side surface E3a. The side surface E3a is a protruding curved surface facing the light source LS when viewed in the first direction X.

As described with reference to FIG. 7 and FIG. 8, the side surface E3a reduces the number of times of the light passing through the liquid crystal layer LC on the incidence side, and thus the light propagated along the second direction Y can hardly be weakened. Therefore, in the present embodiment, the luminance on opposite incidence side can be greater than that of the display device DSP10 in the comparative example. As a result, the luminance gradient is suppressed and the display quality of the display device DSP can be thereby improved.

The first cover member CM1 in the present embodiment further includes a side surface E3b, which is a protruding curved surface. By forming the side surfaces E3a and E3b connecting the main surface F5 with the main surface F6 into curved surfaces, corners formed by the main surfaces F5 and F6 and the side surfaces E3a and E3b can be hardly cracked, and the strength of the first cover member CM1 can be improved.

Further, in the present embodiment, both of the side surfaces E3c and E3d connecting the main surface F5 with the main surface F6 are formed into curved surfaces. Thus, the strength of the first cover member CM1 can be further improved.

As described with reference to FIG. 7 and FIG. 8, the side surface E3b increases the light made incident on the liquid crystal layer LC on the opposite incidence side. As a result, the luminance on the opposite incidence side increases and the luminance gradient can be thereby suppressed. As a result, the display quality of the display device DSP can be further improved.

In the present embodiment, the display device DSP further comprises a second cover member CM2 including a protruding curved side surface E4b. Similarly to the side surface E3b, the side surface E4b can also increase the light made incident on the liquid crystal layer LC on the opposite incidence side. Thus, the luminance on the opposite incidence side further increases, and the luminance gradient is thereby suppressed. As a result, the display quality of the display device DSP can be further improved.

Furthermore, in the second cover member CM2 of the present embodiment, the side surfaces E4a, E4b, E4c, and E4d connecting the main surface F7 with the main surface F8 are all formed into curved surfaces. Thus, corner portions formed by the main surface F7 and the main surface F8 and the side surfaces E4a, E4b, E4c, and E4d can be hardly cracked, and the strength of the second cover member CM2 can be improved.

According to the present embodiment, the display quality of the display device DSP can be improved. Moreover, the above-described various advantages can be obtained from the present embodiment.

Figure 11:
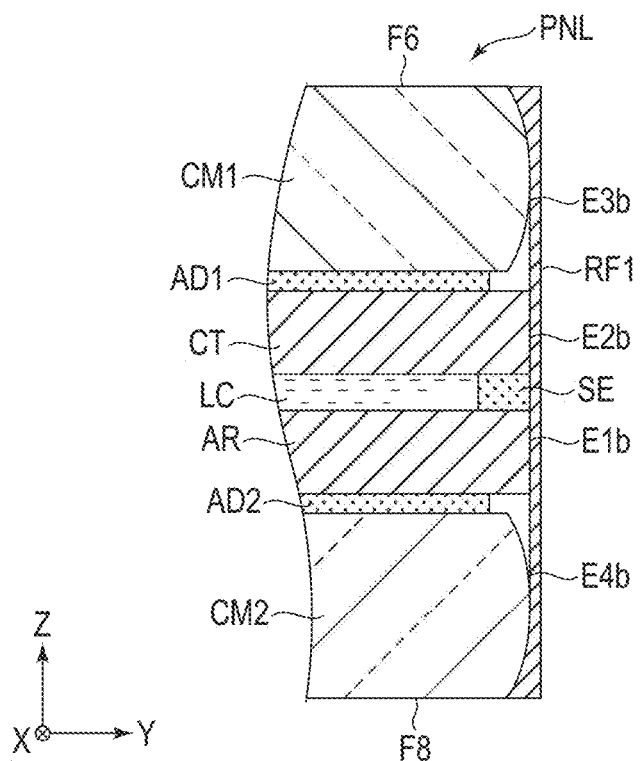
FIG. 11 is a view illustrating another example of a reflective material.
Figure 12:
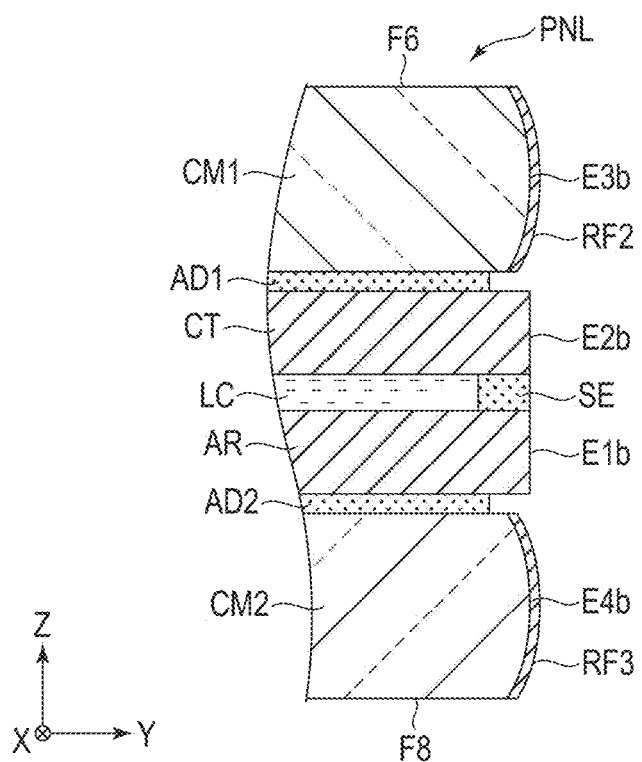
FIG. 12 is a view illustrating yet another example of the reflective material.
Figure 13:
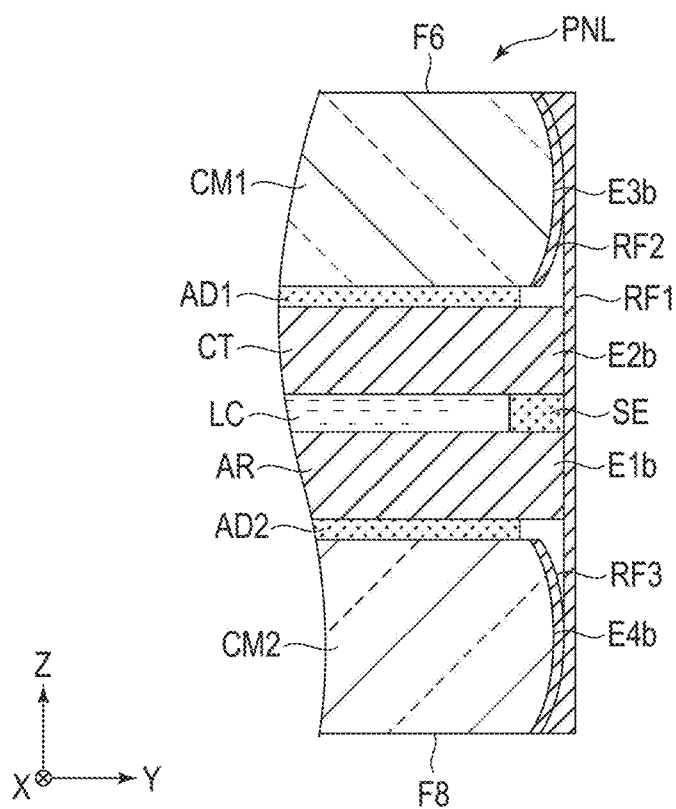
FIG. 13 is a view illustrating yet another example of the reflective material.

The reflective material is not limited to the above example. FIG. 11 to FIG. 13 illustrate other examples of reflective materials.

In the example shown in FIG. 11, the reflective material RF1 is provided on the entire side surface E3b and the entire side surface E4d. In other words, the entire side surface E3b overlaps with the reflective material RF1 in the second direction Y, and the entire side surface E4b overlaps with the reflective material RF1 in the second direction Y. As a result, since light hardly leaks from the opposite incidence side, the light utilization efficiency is improved.

In the example shown in FIG. 12, the display device DSP comprises reflective materials RF2 and RF3, instead of the reflective material RF1. The reflective material RF2 is provided on the entire side surface E3b, and the reflective material RF3 is provided on the entire side surface E4d.

The reflective materials RF2 and RF3 are reflective films, for example. The reflective materials RF2 and RF3 may be formed by coating with materials having optical reflectivity such as silver, or by performing vapor deposition on the materials. The reflective materials RF2 and RF3 are not limited to this example.

By providing the reflective material RF2 on the side surface E3b and providing the reflective material RF3 on the side surface E4d, light hardly leaks from the opposite incidence side. In the example shown in FIG. 12, no reflective material is provided on the side surface E1b of the array substrate AR and the side surface E2b of the counter-substrate CT.

In the example shown in FIG. 13, the reflective material RF1 and the reflective materials RF2 and RF3 are all provided. Since the reflective material RF1 is provided on the side surface E1b of the array substrate AR and the side surface E2b of the counter-substrate CT, light hardly leaks from the opposite incidence side, and thus the light utilization efficiency can be thereby further improved, compared to the example shown in FIG. 12.

In the first cover member CM1, the side surfaces E3c and E3d may have surface properties different from those of the side surfaces E3a and E3b. By forming the side surfaces E3c and E3d into a frosted glass-like shape, light is diffused in the vicinity of the side surfaces E3c and E3d, and non-uniformity in display in the first direction X of the display area DA can be thereby suppressed. The above-described example can be applied to the second cover member CM2 as well.

Next, another embodiment will be described. In the following another embodiment and modified examples, constituent elements identical to those of the first embodiment described above will be designated by the same reference numbers, and detailed descriptions therefor will be omitted or simplified in some cases.

Second Embodiment

A second embodiment will be described. The differences from the first embodiment will be mentioned here, and the same structure as that of the first embodiment can be applied to each part of a display device DSP according to the present embodiment.

Figure 14:
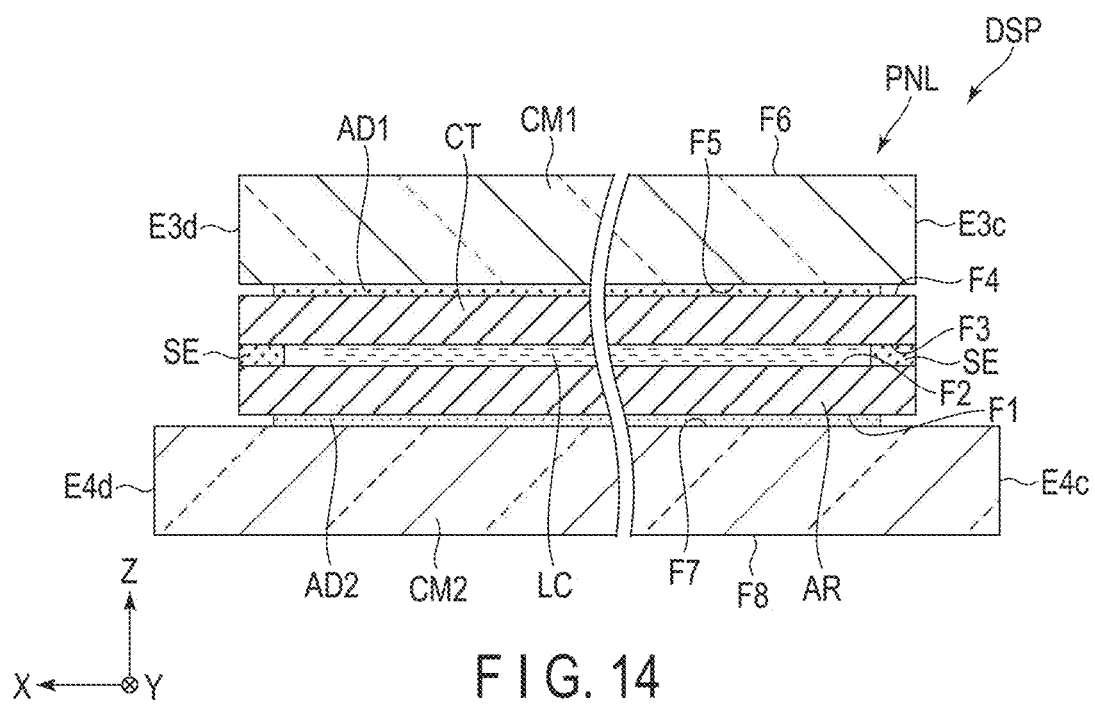
FIG. 14 is a schematic cross-sectional view of a display device according to a second embodiment.

FIG. 14 is a schematic cross-sectional view of the display device DSP according to the present embodiment. In FIG. 14, the section of the display device DSP is viewed in the second direction Y. The present embodiment is different from the first embodiment in side surfaces E3c and E3d of a first cover member CM1 and side surfaces E4c and E4d of a second cover member CM2. Side surfaces E3a and E3b of the first cover member CM1 and side surfaces E4a and E4b of the second cover member CM2 have the same structures as the structures in the example shown in FIG. 4.

As shown in FIG. 14, the first cover member CM1 includes the side surfaces E3c and E3d. The side surfaces E3c and E3d have shapes different from those of the side surfaces E3a and E3b. More specifically, the side surfaces E3c and E3d are the flat surfaces parallel to the Y-Z plane defined by the second direction Y and the third direction Z.

As shown in FIG. 14, the second cover member CM2 includes the side surfaces E4c and E4d. The side surfaces E4c and E4d have shapes different from those of the side surfaces E4a and E4b. More specifically, the side surfaces E4c and E4d are the flat surfaces parallel to the Y-Z plane.

The same advantages as those of the first embodiment can also be obtained from the configuration of the present embodiment. In the present embodiment, the side surfaces E3c, E3d, E4c, and E4d are flat. Thus, the light propagating inside the first cover member CM1 and the second cover member CM2 hardly leaks from the side surfaces E3c, E3d, E4c, and E4d to the outside. As a result, the light utilization efficiency in the display device DSP can be improved.

Third Embodiment

A third embodiment will be described. The differences from each of the embodiments described above will be mentioned here, and the same structure as that of each of the embodiments described above can be applied to each part of a display device DSP according to the present embodiment.

Figure 15:
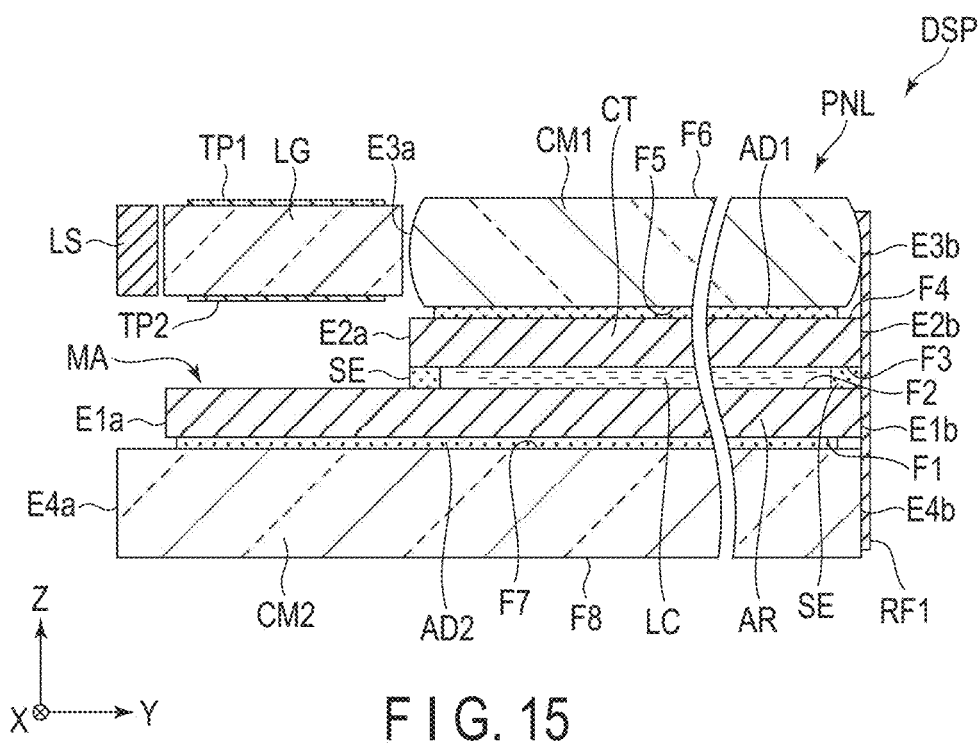
FIG. 15 is a schematic cross-sectional view of a display device according to a third embodiment.
Figure 16:
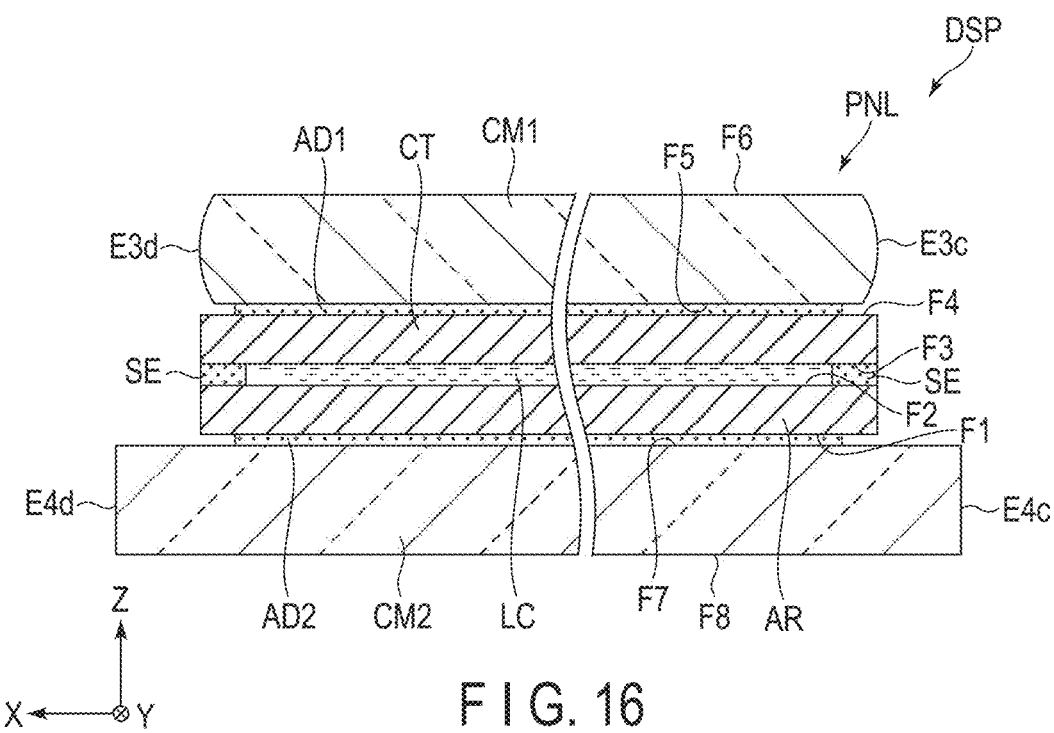
FIG. 16 is a schematic cross-sectional view of the display device according to the third embodiment.

FIG. 15 and FIG. 16 are schematic cross-sectional views of the display device DSP according to the present embodiment. The section of the display device DSP is viewed in the first direction X in FIG. 15, and the section of the display device DSP is viewed in the second direction Y in FIG. 16. The present embodiment is different from the first embodiment in side surfaces E3c and E3d of a first cover member CM1 and side surfaces E4a, E4b, E4c, and E4d of a second cover member CM2.

As shown in FIG. 16, the first cover member CM1 includes the side surfaces E3c and E3d. The side surfaces E3c and E3d are the flat surfaces parallel to the Y-Z plane. As shown in FIG. 15 and FIG. 16, the second cover member CM2 includes the side surfaces E4a, E4b, E4c, and E4d.

The side surfaces E4a and E4b are the flat surfaces parallel to the X-Z plane, and the side surfaces E4c and E4d are the flat surfaces parallel to the Y-Z plane. The same advantages as those of each of the embodiments described above can also be obtained from the configuration of the present embodiment.

Fourth Embodiment

A fourth embodiment will be described. The differences from each of the embodiments described above will be mentioned here, and the same structure as that of each of the embodiments described above can be applied to each part of a display device DSP according to the present embodiment.

Figure 17:
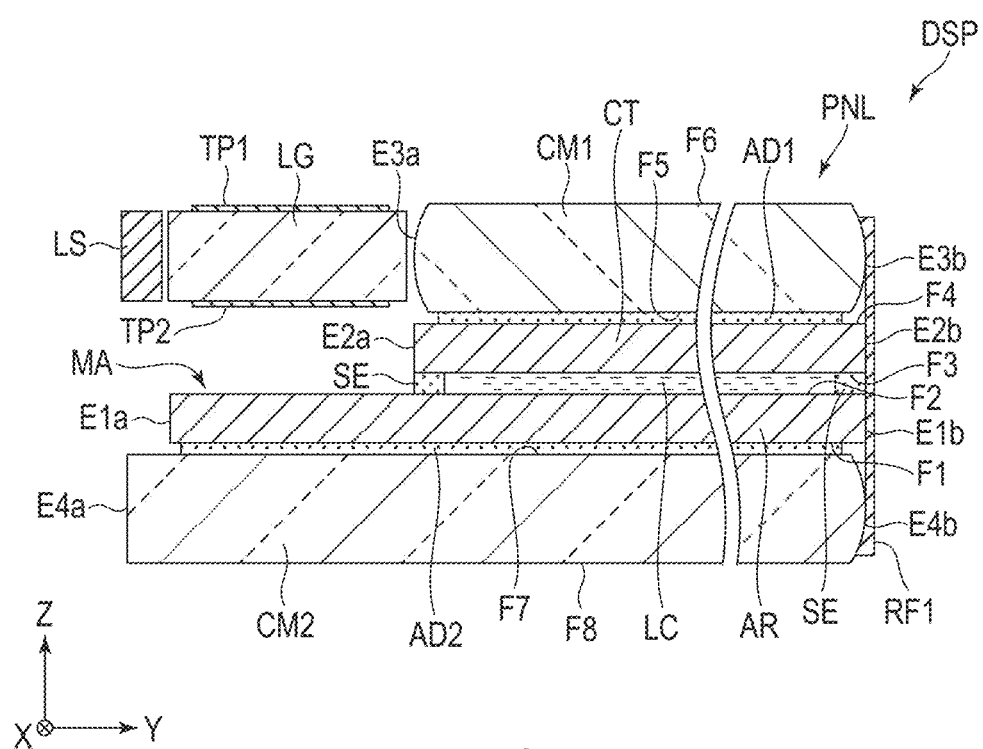
FIG. 17 is a schematic cross-sectional view of a display device according to a fourth embodiment.

FIG. 17 is a schematic cross-sectional view of the display device DSP according to the present embodiment. In FIG.

17, the section of the display device DSP is viewed in the first direction X. The present embodiment is different from the second embodiment in a side surface E4a of a second cover member CM2. Side surfaces E3c and E3d of a first cover member CM1 and side surfaces E4c and E4d of the second cover member CM2 have the same structures as the structures in the example shown in FIG. 14.

As shown in FIG. 17, the second cover member CM2 includes the side surface E4a. The side surface E4a is the flat surface parallel to the X-Z plane. Although not shown in the figure, the side surfaces E3c, E3d, E4c, and E4d are the flat surfaces parallel to the Y-Z plane.

The same advantages as those of each of the embodiments described above can also be obtained from the configuration of the present embodiment. In the present embodiment, light hardly leaks from the side surfaces E3c, E3d, E4c, and E4d to the outside and the light on the opposite incidence side is easily made incident on the liquid crystal layer LC, thereby improving the light utilization efficiency.

In the second to fourth embodiments, the reflective materials RF1, RF2, and RF3 described with reference to FIG. 11 to FIG. 13 can be applied, respectively.

All of the display devices that can be implemented by a person of ordinary skill in the art through arbitrary design changes to the display device described above as the embodiment of the present invention come within the scope of the present invention as long as they are in keeping with the spirit of the present invention.

Various types of the modified examples are easily conceivable within the category of the ideas of the present invention by a person of ordinary skill in the art and the modified examples are also considered to come within the scope of the present invention. For example, additions, deletions or changes in design of the constituent elements or additions, omissions, or changes in condition of the processes arbitrarily conducted by a person of ordinary skill in the art, in the above embodiments, come within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
an array substrate;
a counter-substrate facing the array substrate;
a liquid crystal layer located between the array substrate and the counter-substrate;
a transparent first cover member including a first main surface facing the counter-substrate, a second main surface located on a side opposite to the first main surface, and a first side surface extending in a first direction, and a second side surface extending in the first direction and arranged with the first side surface in the second direction;
a transparent second cover member including a third main surface facing the array substrate, a fourth main surface located on a side opposite to the third main surface, and a third side surface extending in the first direction; and
a light source applying light toward the first side surface along a second direction intersecting the first direction, wherein the first side surface is a protruding curved surface connecting the first main surface with the second main surface and facing the light source, when viewed in the first direction,
the second side surface is a protruding curved surface connecting the first main surface with the second main surface, when viewed in the first direction, and
the third side surface is a protruding curved surface connecting the third main surface with the fourth main surface and protruding in the second direction, when viewed in the first direction.

2. The display device of claim 1, wherein
the transparent second cover member further includes a fourth side surface extending in the first direction and arranged with the third side surface in the second direction, and
the fourth side surface is a protruding curved surface connecting the third main surface with the fourth main surface and protruding in a direction opposite to the second direction, when viewed in the first direction.

3. The display device of claim 1, wherein
the transparent second cover member further includes a flat fourth side surface extending in the first direction and arranged with the third side surface in the second direction.

4. The display device of claim 1, wherein
the transparent first cover member further includes a fifth side surface extending in the second direction and a sixth side surface extending in the second direction and arranged with the fifth side surface in the first direction, and
the fifth side surface and the sixth side surface are protruding curved surfaces connecting the first main surface with the second main surface, when viewed in the second direction.

5. The display device of claim 1, wherein
the transparent first cover member further includes a fifth side surface extending in the second direction and a sixth side surface extending in the second direction and arranged with the fifth side surface in the first direction, and
the fifth side surface and the sixth side surface are flat surfaces.

6. The display device of claim 1, wherein
the transparent second cover member further includes a seventh side surface extending in the second direction and an eighth side surface extending in the second direction and arranged with the seventh side surface in the first direction, and
the seventh side surface and the eighth side surface are flat surfaces.

7. The display device of claim 1, wherein
the transparent second cover member further includes a seventh side surface extending in the second direction and an eighth side surface extending in the second direction and arranged with the seventh side surface in the first direction, and
the seventh side surface and the eighth side surface are protruding curved surfaces connecting the third main surface with the fourth main surface, when viewed in the second direction Y.

8. The display device of claim 1, wherein
a radius of curvature of the first side surface is 2.0 mm or more and 2.5 mm or less.

9. The display device of claim 8, wherein
the transparent first cover member has a thickness two or more times as thick as the array substrate.

10. The display device of claim 1, wherein the first side surface is formed into a mirror surface.

11. The display device of claim 1, wherein the first side surface is formed into a rough surface.

12. The display device of claim 1, wherein the transparent first cover member further includes a fifth side surface extending in the second direction and a sixth side surface extending in the second direction and arranged with the fifth side surface in the first direction,
the first side surface and the second side surface are formed into mirror surfaces, and
the fifth side surface and the sixth side surface are formed into rough surfaces.

13. The display device of claim 1, further comprising:
a reflective material, wherein
the transparent first cover member further includes a second side surface extending in the first direction and arranged with the first side surface in the second direction, and
the reflective material is provided on the second side surface.

14. The display device of claim 13, wherein the second side surface includes a portion not overlapping with the reflective material and located on the second main surface side in the second direction.

15. The display device of claim 1, further comprising:
a reflective material, wherein
the reflective material is located on the second side surface and the third side surface.

16. The display device of claim 1, wherein the liquid crystal layer can switch a state in which light made incident is transmitted and a state in which the light is scattered, in accordance with applied voltage.

17. The display device of claim 1, further comprising:
a light guide provided between the first side surface and the light source.

18. The display device of claim 17, wherein the array substrate includes a mounting area formed on a portion protruding relative to the counter-substrate in a direction opposite to the second direction, and
the light guide overlaps with the mounting area.

* * * * *